United States Patent [19]

Berneski, Jr. et al.

[11] Patent Number: 5,676,174
[45] Date of Patent: Oct. 14, 1997

[54] OUTER DIAMETER PIPE PLUG

[75] Inventors: James P. Berneski, Jr., Warrington; Henry E. Brandenberger, Hatfield; Eugene E. Cunningham, Perkasie, all of Pa.

[73] Assignee: EST Group, Inc., Harleysville, Pa.

[21] Appl. No.: 494,099

[22] Filed: Jun. 23, 1995

[51] Int. Cl.$^6$ .................................................... F16L 55/10
[52] U.S. Cl. ........................ 138/89; 138/90; 138/96 R; 73/49.8
[58] Field of Search ............................. 138/89, 90, 94, 138/109, 96 R; 73/49.5, 49.8

[56] References Cited

U.S. PATENT DOCUMENTS

| | | | |
|---|---|---|---|
| 2,886,067 | 5/1959 | Maxwell et al. | 138/90 |
| 3,434,337 | 3/1969 | Goeke | 73/49.8 |
| 3,803,901 | 4/1974 | McConnell et al. | 138/90 X |
| 4,077,250 | 3/1978 | Wesch | 138/90 X |
| 4,281,535 | 8/1981 | Wesch, Jr. | 73/49.8 |
| 4,312,708 | 1/1982 | Leslie | 376/203 |
| 4,381,800 | 5/1983 | Leslie | 138/90 |
| 4,393,674 | 7/1983 | Rasmussen | 73/49.8 X |
| 4,602,500 | 7/1986 | Kelly | 73/49.8 |
| 4,611,485 | 9/1986 | Leslie | 138/90 X |
| 4,809,751 | 3/1989 | McKenzie | 138/89 |
| 4,820,474 | 4/1989 | Leslie et al. | 138/89 X |
| 4,887,646 | 12/1989 | Groves | 138/90 |
| 4,909,280 | 3/1990 | Friedrich et al. | 138/90 |

*Primary Examiner*—Patrick Brinson
*Attorney, Agent, or Firm*—Howson and Howson

[57] ABSTRACT

An outer diameter plug is provided for sealing the open end of a pipe. The plug is capable of being reused on a range of pipe outer diameter tolerances and of providing effective fluid-tight sealing over a range of internal pressures. The plug is particularly suited for use in pressure testing pipes by means of pressure fluids admitted to the pipes through the plug.

24 Claims, 3 Drawing Sheets

OUTER DIAMETER PIPE PLUG

FIELD OF THE INVENTION

The present invention relates to a plug for sealing the open end of a pipe under pressure, and more particularly, the present invention relates to a reusable quick-connect test plug which forms a fluid-tight high-pressure seal on the outer periphery of the pipe adjacent its open end and which accommodates a range of outer pipe diameter tolerances.

BACKGROUND OF THE INVENTION

It is conventional practice for pipes, tubes and the like to be tested for leaks. Such a practice involves sealing the open ends of the pipe and pressurizing the pipe with a fluid such as gas, including air or nitrogen, or a liquid, such as an hydraulic fluid. These tests often must be performed quickly on a production basis in a pipe manufacturing plant.

Various pipes have different pressure ratings. For instance, depending on the pipe wall material and thickness, as determined by the difference between the inner and outer diameter of the pipe, the pipe may be pressure rated to 10,000 psi, or higher. The test plug that seals the open ends of the pipe must be capable of withstanding at least the pressure rating of the pipe to resist blow-out and to provide a satisfactory leak-test.

U.S. Pat. No. 4,077,250 issued to Wesch, and No. 4,887,646 issued to Groves disclose test plugs which seal against the outer periphery of a pipe adjacent an open end. For instance, Wesch discloses grippers which secure the test plug to the outer periphery of the pipe. It also discloses a seal compressed against the outer periphery of the pipe. The seal is retained in a groove in an annular portion of the test plug assembly.

A problem with creating a fluid-tight seal against the outer periphery of a pipe is that the pipe may not have a perfectly circular cross-section, and the outer diameters of pipes may fall inside or outside of a range of design tolerances depending on the ability of the pipe manufacturer to maintain tolerances during manufacture. Therefore, even if a test plug is specifically designed for a certain size pipe, it may not be able to create a fluid-tight seal of sufficient strength due either to the non-uniform shape of the pipe or to its variation from design tolerances, or a combination of these and other factors.

A pipe may be larger than its design size. This may be true for its entire circumference; or, it may be true just along certain non-circular portions of the pipe periphery. When this occurs, it is often difficult to install an outer diameter (O.D.) test plug having an O-ring on the outer periphery of the pipe, because the pipe is too large for the O-ring that must be compressed against the pipe. During installation, a large pipe tends to extrude the O-ring outside of its retaining groove, and the pipe may not even be capable of being inserted into the test plug.

A pipe may also have an outer diameter which is smaller than its design size. In this circumstance, the O-ring may not be sufficiently compressed against the outer periphery of the pipe so that a fluid-tight seal of sufficient strength is not created. In addition, a gap between the plug wall adjacent the O-ring retaining groove and the outer periphery of the pipe may allow the O-ring to extrude outside of the groove, and possibly blow out of the groove entirely when the pipe is pressurized.

While O.D. plug assemblies having deformable O-rings can function satisfactorily under certain conditions, it has been found that the creation of an effective fluid-tight pressure-resistant seal in a specific size pipe is difficult to accomplish because the stated size is often different from the actual size and shape of the outer periphery of the pipe. A satisfactory outer diameter test plug must be able to accommodate variations in manufacturing tolerances of the outer peripheries of production pipes and be able to maintain a strong fluid-tight seal at pressures as high as 10,000 psi. It is also desirable for an outer diameter test plug assembly to be composed of a minimum of components and to be quickly connectable to and disconnectable from a pipe without the need for any tools.

OBJECTS OF THE INVENTION

With the foregoing in mind, a primary object of the present invention is to provide an improved outer diameter plug assembly for use in creating a fluid-tight seal on an outer periphery of a pipe adjacent its open end.

Another object of the present invention is to provide a novel test plug which can maintain effective pressure sealing over a relatively wide range of pipe outer diameters and outer surface conditions.

A further object of the present invention is to provide a unique outside diameter pipe plug O-ring holding and compressing assembly which contains the O-ring within its groove and which prevents the O-ring from extruding outside of the groove either during installation on a pipe or during its pressurization.

A still further object of the present invention is to provide a high-pressure outside diameter test plug of relatively simple construction for use on a range of pipe size diameters and tolerances.

Yet another object of the present invention is to provide a reusable outside diameter test plug which can be quickly installed and removed without the use of tools while providing a leak-resistant connection.

SUMMARY OF THE INVENTION

More specifically, the present invention provides an outer diameter pipe plug which can effectively seal the open end of a pipe under relatively high-pressures and over a relatively wide range of pipe tolerances and degrees of noncircularity.

The plug comprises a tubular sleeve which has an interior chamber with front and rear openings aligned axially in the sleeve. The rear opening of the sleeve is capable of telescopically receiving the outer periphery of a pipe adjacent its open end.

The sleeve contains means for gripping the pipe outer periphery and a resilient annular seal element containing an O-ring engageable with the pipe. The gripping means secures the sleeve to the pipe with increasing force as pressure in the pipe increases. In addition, the sleeve cooperates with the resilient annular element to urge the O-ring into tighter engagement with the pipe as pressure increases.

The plug includes means for driving the gripping means and the annular seal element in both an axial and a radial direction toward the outer periphery of the pipe to create the above-described fluid-tight seal.

In one embodiment, the means for initially driving the gripper means and seal element in an axial direction is a driving insert which is threadedly coupled to the sleeve adjacent the front opening of the sleeve. The driving insert has a radial endface which abuts the gripper means and forces the gripper means and annular seal element in an axial direction along the outer periphery of the pipe. The sleeve has means for camming both the gripper means and the annular seal element radially inward toward the outer periphery of the pipe in response to the axial movement of the driving insert. In the disclosed embodiment, the camming means includes a frusto-conical inner wall surface in the sleeve.

The gripping means includes a series of metal segments arranged in an annular array and having teeth that engage the outer periphery of the pipe. A spring element normally biases the segments radially outward into a dilated position to facilitate insertion and withdrawal of the pipe.

When the pipe is pressurized, the sleeve moves axially away from the pipe due to pressure-induced force on the insert. This causes the camming means to force the gripper segments tightly against the pipe periphery. Simultaneously, pressure admitted to the annular seal element via small spaces between the gripping segments causes the camming surface to urge the annular seal and its confined O-ring tightly against the pipe periphery.

BRIEF DESCRIPTION OF THE DRAWINGS

The foregoing and other objects, features and advantages of the present invention should become apparent from the following description when taken in conjunction with the accompanying drawings, in which.

DETAILED DESCRIPTION OF THE PREFERRED EMBODIMENT

Figure 1:
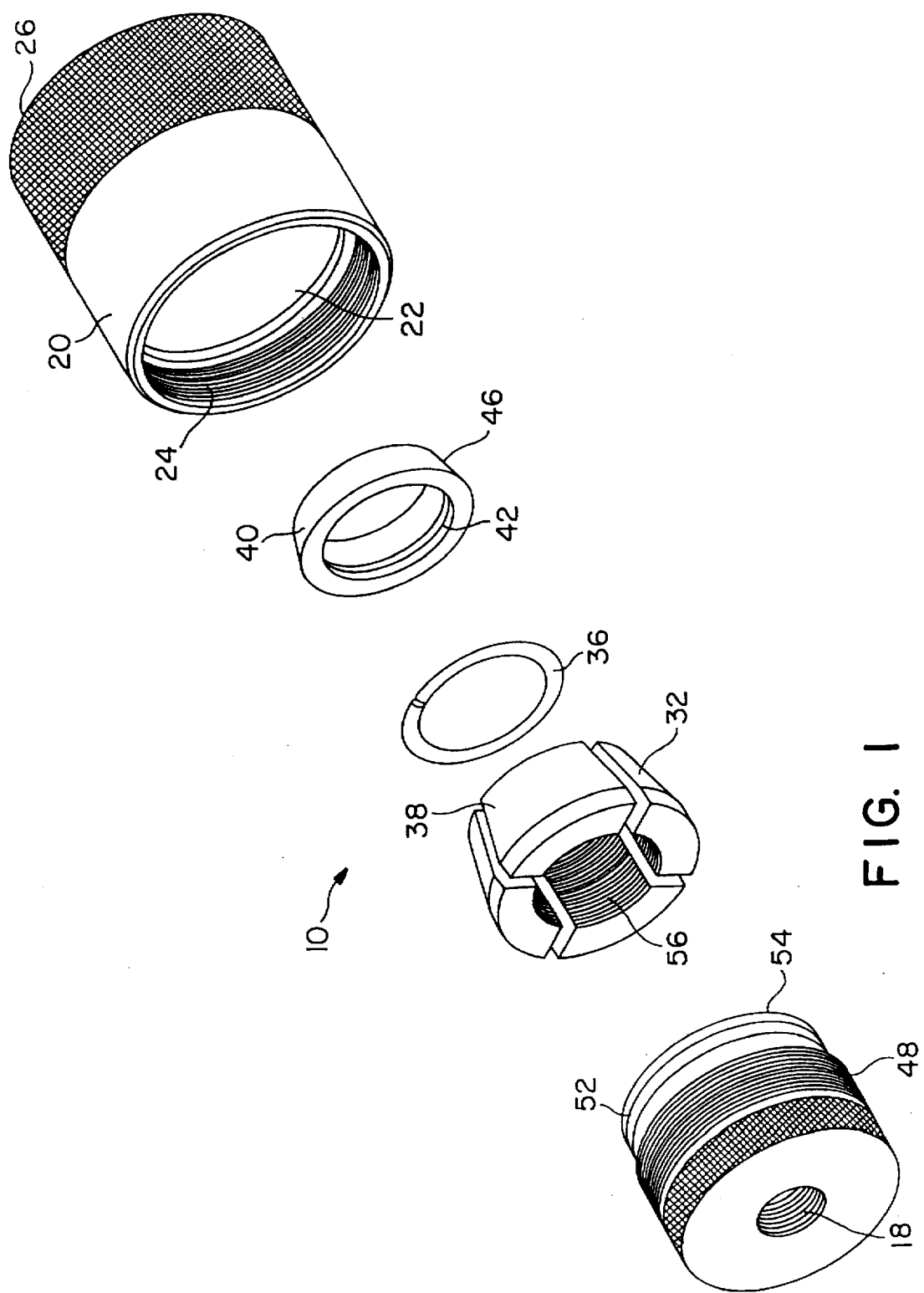
FIG. 1 is a perspective exploded view of an outer diameter pipe plug embodying the present invention.
Figure 2:
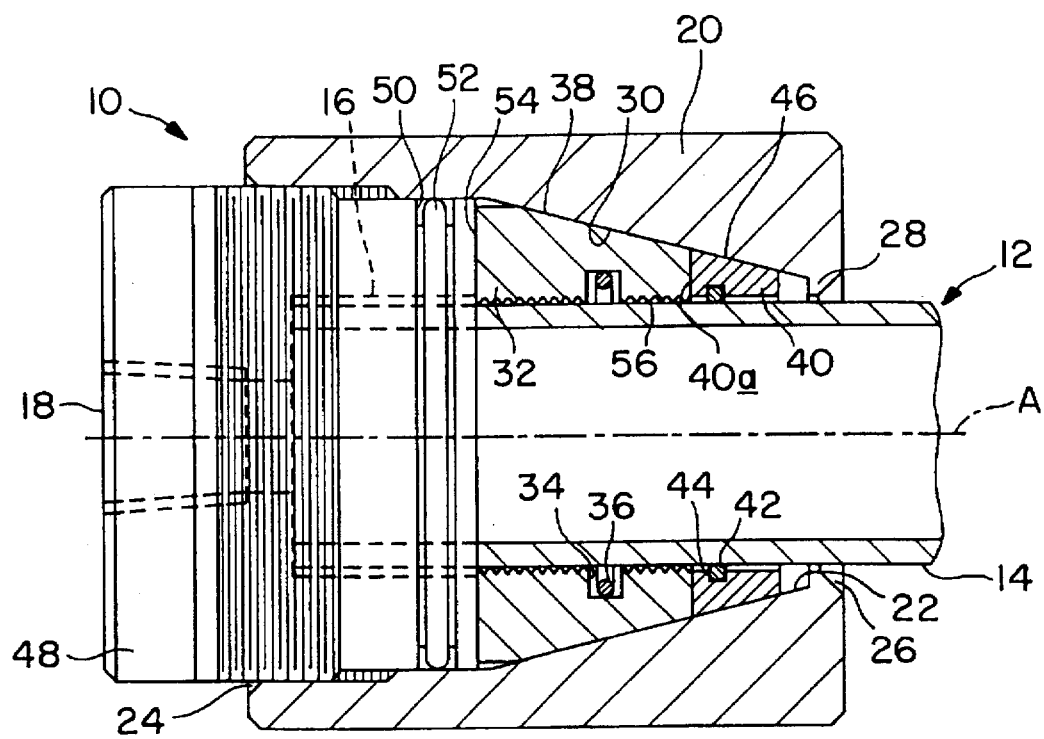
FIG. 2 is a partially cross-sectioned longitudinal view of the plug shown affixed to the end of a pipe.

Referring now to the drawings, FIGS. 1-4 illustrate a plug 10 embodying the present invention. The plug 10 is used to create a fluid-tight seal against an outer periphery 14 of a pipe 12 adjacent its open end 16 (pipe not shown in FIG. 1), and is particularly well suited for use in production pressure testing where quick installation and removal is important. When the plug 10 is installed on the open end 16 of the pipe 12, pressurizing equipment (not shown) can be threadedly coupled to the plug 10 to enable the pipe 12 to be pressurized with a fluid, such as a liquid or a gas. As shown in FIG. 2, the liquid or gas enters the pipe through a small threaded orifice 18 in the plug 10 adjacent the open end 16 of the pipe 12.

When the plug 10 is installed, the pipe is pressurized with sufficient pressure to test for leaks. The amount of pressure applied within the pipe depends on the design pressure rating of the pipe. The test plug 10 of the present invention is designed to create a fluid-tight seal sufficient to withstand internal pipe pressures as high as 10,000 psi without requiring tools to mount and dismount the test plug.

As best seen in FIG. 2, the test plug 10 includes a tubular sleeve 20 for receiving the open end 16 of the pipe 12. The sleeve 20 has an internal chamber 22 with a longitudinal axis A extending centrally through the sleeve. The sleeve internal chamber 22 has a front opening 24 and a radial shoulder 28 with a rear opening 26. The sleeve 20 is internally threaded adjacent the front opening 24, and the outer periphery on the sleeve 20 is knurled adjacent its rear end. As shown in the FIGS. 2-4, the sleeve 20 has a frusto-conical interior surface portion 30 that tapers axially and inwardly toward the rear end shoulder 28. Thus, the rear opening 26 is smaller in diameter than the front opening 24.

The sleeve 20 contains a means for gripping the outer periphery 14 of the pipe 12 to hold the test plug in place, and a means to create a fluid-tight seal against the outer periphery 14 of the pipe 12, even though the pipe 12 may vary in size from nominal tolerances and may not be perfectly circular in cross-section.

Figure 3:
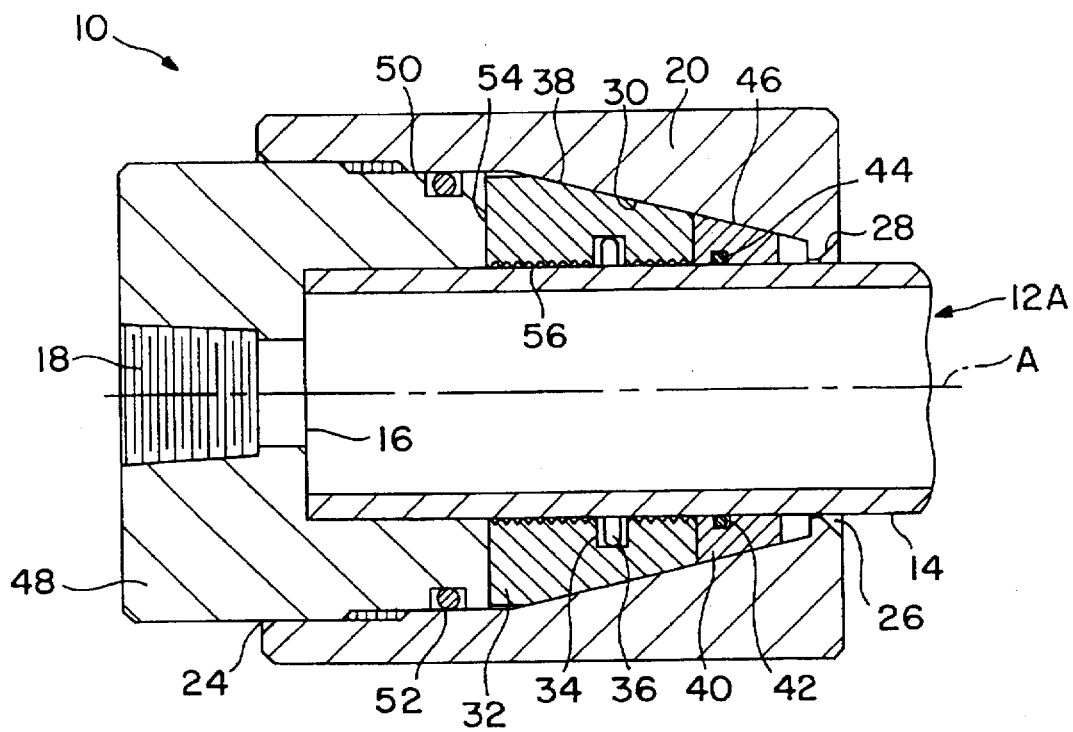
FIG. 3 is a longitudinal cross-sectional view showing the plug installed on a pipe having an outer diameter at the large end of its design tolerance range.
Figure 4:
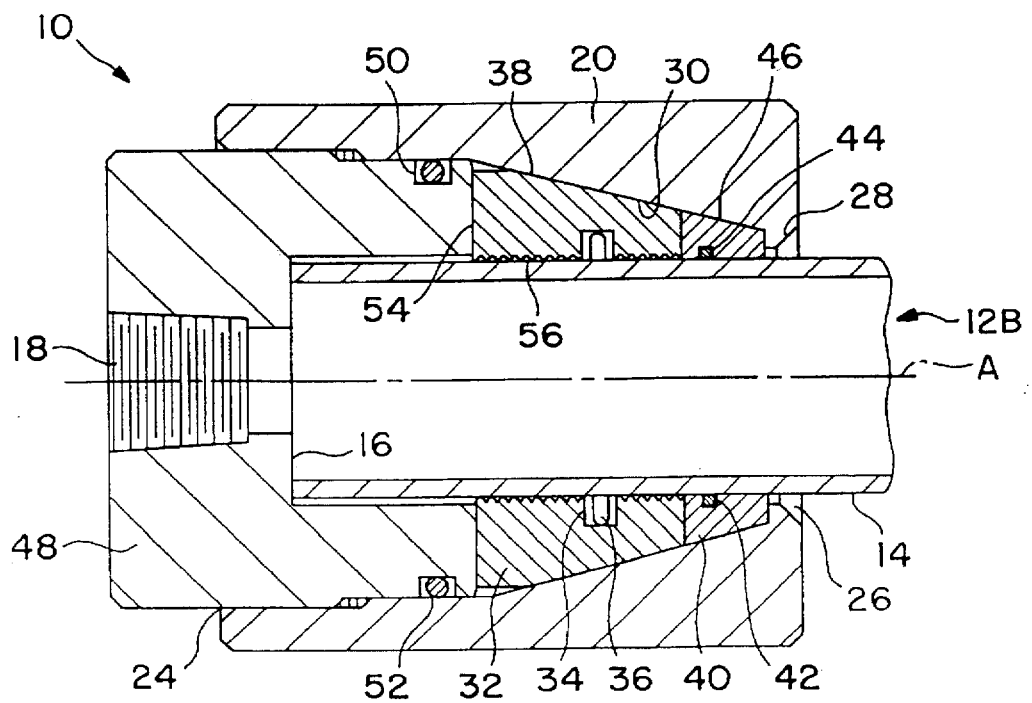
FIG. 4 is a longitudinal cross-sectional view showing the plug installed on a pipe having an outer diameter at the small end of its design tolerance range.

To this end, as best seen in FIG. 1, the gripper means comprises an assembly of a plurality of independent metal segments 32 arranged in an annular array with small air gaps or passages, between their abutting axial surfaces. Each segment has a series of teeth 56 on its inner periphery. Each segment 32 also has a groove 34 on its inner periphery for receiving a ring-like spring clip 36, such as a well-known split C-ring. As illustrated in FIGS. 2-4, the outer surfaces 38 of the segments 32 include a tapered portion complementary to the internal tapered sleeve surface 30. The tapered outer surface of the grippers cooperatively engage the tapered interior surface 30 of the sleeve 20 for purposes to be described. The clip 36 forces the segments 32 radially outward so that all outer surfaces 38 of the segments 32 contact the tapered portion 30 of the interior surface of the sleeve 20 and the teeth 56 are normally biased away from the pipe periphery.

A resilient annular seal element 40 and a contained O-ring 42 both of elastomeric materials create a fluid-tight seal against the outer periphery 14 of the pipe 12. The seal element 40 is of sufficient size to initially somewhat loosely gird, or encircle, the outer periphery of the pipe. The seal element 40 has an inner surface with a groove 44 for retaining the O-ring 42 as shown in FIG. 2. Both are sized to be slightly larger than the maximum anticipated outer diameter of a pipe to be tested.

The seal element 40 is originally fabricated with an inside diameter dimension such that it does not contact the outer periphery 14 of the pipe 12 when it is initially assembled over the pipe 12. The sleeve 30 compresses the seal element 40 axially inward a sufficient distance to enable the entire inner diameter surface of seal element 40 to contact the outer periphery 14 of pipe 12. The resiliency of the seal element 40 enables it to conform to this smaller dimension and to return to its originally fabricated dimension after being removed from the pipe 12. The advantage of employing a resilient seal element 40 as an O-ring carrier is that when the seal element 40 abuts the outer periphery 14 of the pipe 12, it effectively captures the O-ring 42 within its groove 44. When the O-ring 42 is thus captured and compressed, it stays entirely within the groove 44 of the seal element 40 and does not extrude outside of the groove 44. Preferably, the seal element 40 has a higher durometer than the elastomeric material of the O-ring 42.

Like the gripper assembly, the seal element 40 has a tapered outer surface 46 which cooperatively engages the complementary tapered inner surface portion 30 of the sleeve 20. When initially installed, the seal element 40 is located adjacent the gripper segments 32 toward the rear opening 26 of the sleeve 20. However, as will be discussed, the seal element 40 separates slightly axially from the gripper segments when the pipe is pressurized. The sleeve shoulder 28 provides a positive stop for the seal element 40 during such separation in order to prevent the seal from being extruded through the opening between the pipe and the sleeve by high pressures applied over prolonged time periods.

In order initially to displace the gripper segments 32 and the seal element 40 in an axial direction relative to the sleeve 20 and the pipe 14, the plug 10 includes a driving insert 48. The driving insert 48, as shown in the drawings, has a radial endface 54 that engages the gripper segments 32. The insert 48 also has an outer peripheral groove 50 which retains an O-ring 52 to provide a fluid-tight seal between the driving insert 48 and inner periphery of the sleeve 20 adjacent the front opening 24. The driving insert 48 threadedly engages the internally threaded portion of the sleeve 20 adjacent its front opening 24. The insert 48 is externally knurled to facilitate its manual rotation, and hence displacement into the sleeve 20, without the need for tools. The insert 48 has a female threaded port 18 which provides a connection to pressurizing equipment (not shown).

Prior to assembly, the tapered sleeve surface 30 is lightly lubricated. The seal element 40 and its O-ring 36 are first inserted through the sleeve open front end 24, followed by the gripper segments 32 which are squeezed together as they are inserted axially. Thereafter, the driving insert 48 is threaded loosely into the sleeve 20. When in such relation, the gripper element teeth 56, seal element 40 and O-ring 42, are dilated to facilitate sliding of the plug 10 axially onto the end of a pipe.

The initial condition of installation of the plus 10, before pressure has been applied, is illustrated in FIG. 3, wherein the plug 10 has been manually assembled on a pipe 12A having a relatively large diameter that is at the outer end of the tolerance for the pipe. The driving insert 48, having been loosely threadedly coupled to the sleeve 20, and rotated to advance a predetermined distance into the interior sleeve chamber 22 during assembly, is now rotated further in to the sleeve 20. This initially displaces the gripper segments 32 deeper into the sleeve, and by virtue of their engagement with the seal element 40, the seal element 40 is likewise advanced. Continued rotation causes the gripper segment teeth 56 to engage the outer periphery 14 of the pipe 12A and thereby initially grip the end of the pipe. When this occurs, O-ring 42 is compressed gently against the outer periphery 14 of the pipe 12A.

Figure 2A:
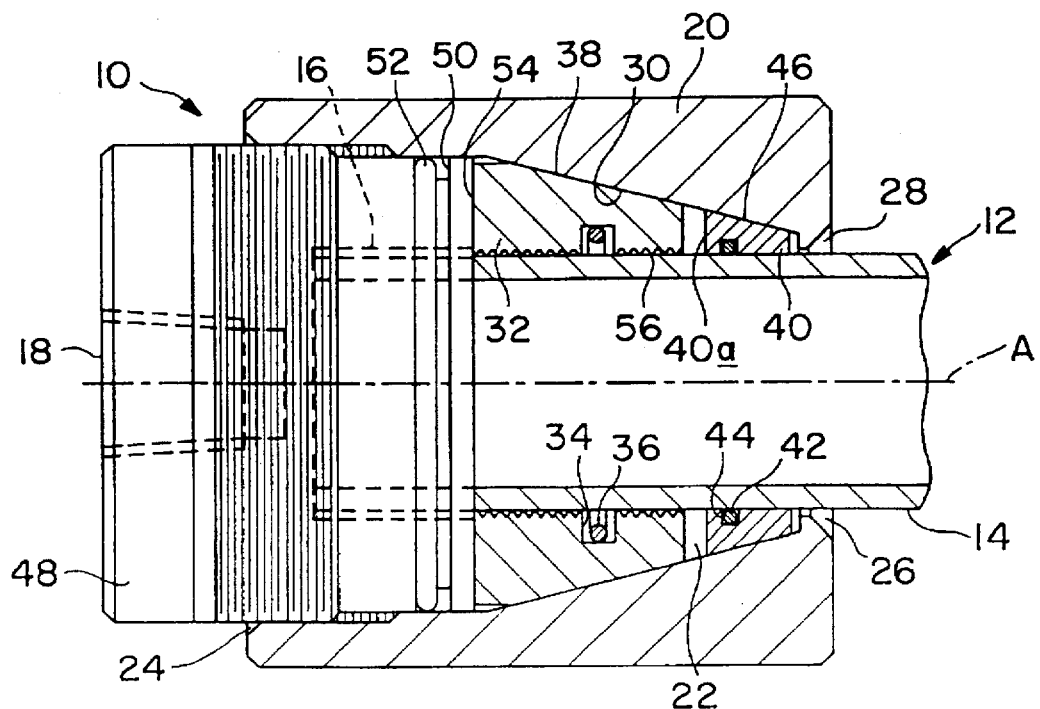
FIG. 2A is a view, similar to FIG. 2, but illustrating the relative positions of various elements of the plug after the pipe has been pressurized.

The plug 10 is firmly secured to the pipe 14, and the pipe sealed, when pressure is applied inside the pipe 14 through the port 18. As best seen in FIG. 2A, pressure in the pipe acts leftward on the inside of the insert 48 to urge it leftward away from the pipe end. As the insert 48 moves leftward, it causes the sleeve 20, and its camming surface 30, to move leftward to constrict the gripper segments 32 firmly against the outer periphery of the pipe 14. This causes the gripper teeth to bite into the pipe peripheral surface with increasing force with increasing applied pressure in the pipe. Simultaneously, pressure is applied to the radial endface 40a of the annular seal element 40 through the small passages provided between the gripper elements. This pressure urges the annular seal 40 rightward. As the annular seal moves rightward, its tapered surface 46 is pressed firmly against the sleeve camming surface 30, thereby firmly urging the inner periphery of the seal element 40, and hence its captured O-ring 42, into fluid-tight sealing engagement with the pipe periphery. The O-ring 52 on the driving insert prevents leakage between the insert 48 and the sleeve 20.

FIG. 4 illustrates a smaller pipe size 12B on which the test plug 10 has been applied. As seen therein, the driving insert 48 has been initially advanced further into the sleeve 20 during hand tightening, than in FIG. 3, thereby forcing the gripper segments 32 and seal element 40 a further distance axially in the sleeve 30 than that shown in FIG. 3. The camming tapered surfaces on the sleeve 20, gripper segments 32, and seal element 40 displace the gripper and resilient seal element radially inward toward the outer periphery of the pipe 12B. When the pipe is pressurized, as described before, the resilient annular seal element 40 fluid-tightly engages the outer periphery of the pipe 12B, even though the pipe is of a smaller diameter than the one shown in FIG. 3. This provides a major advantage over known O.D. test plugs, since even though the pipe has a smaller diameter, the resilient seal element 40 prevents the O-ring 42 from being blown out of its groove 44 when pressure is applied in the pipe.

By way of example, and not by way of limitation, outer diameter test plugs fabricated in accordance with the present invention have been tested and found capable of providing an effective seal in pipes having a range of outer diameter tolerances. For instance, one outer diameter test plug was installed on a nominal 1.5 inch pipe having outer diameters ranging from 1.515 to 1.469 inches and provided an effective seal with an internal pipe pressure as high as 10,000 psi.

The plug 10 is preferably made of steel, such as carbon or stainless; however, for larger diameter pipes, high-strength light weight materials such as aluminum, titanium and the like may be preferable simply to lighten the weight so as to make the plug easier to handle repeatedly by a workman. Also, other means may be utilized to displace the driving insert, such as a lever and cam arrangement, or an expansible chamber device, such as a piston moveable in a cylinder pressured by fluid. In the illustrated embodiment, small spaces are provided between the axial extending edges of the gripper segments to pressurize the seal. However, small passages could be bored axially through each gripper segment, if desired.

In view of the foregoing, it should be apparent that the present invention now provides a relatively simple yet sturdy outer diameter test plug capable of being reused on a range of pipe tolerances and at relatively high pressure levels. The test plug has a minimum of parts and is reusable repeatedly. Moreover, the test plug can be mounted and dismounted without requiring tools.

While a preferred embodiment of the present invention has been described in detail, various modifications, alterations, and changes may be made without departing from the spirit and scope of the present invention as defined in the appended claims.

We claim:

1. An outside-diameter plug for creating a fluid-tight seal at an open end of a pipe, comprising:

a compressible O-ring for encircling an outer periphery of the pipe adjacent to said open end;

a resilient annular seal element having an inner peripheral groove for retaining said O-ring;

a sleeve surrounding said seal element and having an inwardly tapered surface engageable therewith, means for displacing said sleeve relative to said seal element for urging said seal element against the outer periphery of the pipe and thereby urging said O-ring into sealing engagement therewith, whereby the O-ring seats in the groove and against the pipe periphery without undergoing unwanted deformation.

2. A plug according to claim 1 wherein said sleeve displacing means includes:

a driving insert engageable with said sleeve and moveable axially thereof toward said tapered sleeve surface for compressing the seal element and O-ring against the pipe.

3. A plug according to claim 2 including gripper means carried in said sleeve and engaged between said driving insert and said seal element, said gripper means having a tapered peripheral surface engaging said tapered sleeve surface for causing said gripper means to be urged radially inward against said pipe when said insert is displaced axially into said sleeve, and having passage means in said gripper means for admitting pressure fluid to said seal element when said pipe is pressurized.

4. A plug according to claim 3 wherein said driving insert threadedly engages said sleeve and is operable upon rotation to move axially therein, and said gripper means includes a plurality of segments arranged in an annular array, each segment having teeth operatively engageable with the outer periphery of the pipe for securing said sleeve thereto, and gaps between adjacent segments providing said passage means.

5. An outside diameter plug for creating a fluid-tight seal about an outer peripheral surface adjacent an open end of a pipe, comprising:

a sleeve adapted to telescopically receive an axial end portion of a pipe, said sleeve having a camming surface surrounding said pipe end portion;

gripper means moveable in said sleeve for cooperating with said camming surface to secure the sleeve to said outer peripheral surface of the pipe;

a resilient annular seal element in said sleeve axially adjacent to said gripper means for engaging the outer peripheral surface of the pipe, said annular seal element having a tapered outer peripheral surface engaging said camming surface and an inner peripheral groove confronting said pipe;

an O-ring retained in said groove of said annular seal element; and driving means moveable relative to said sleeve for engaging said gripper means and said tapered annular seal element and camming them against said outer peripheral surface of the pipe;

whereby the gripper means resists axial disengagement of the sleeve from the pipe when pressure is applied therein as the O-ring and resilient annular seal element are compressed against the outer periphery of the pipe.

6. A plug according to claim 5, wherein said sleeve has a front end with an opening for receiving said gripper means and said seal element, and a rear end with an opening smaller than said front end opening for receiving said open end portion of the pipe, and said camming surface tapers inwardly toward said rear end opening.

7. A plug according to claim 6, wherein said driving means comprises a driving insert receivable within said sleeve for applying a force to said gripper means and said annular seal in an axial direction so that said camming surface urges them toward the outer periphery of the pipe.

8. A plug according to claim 7, wherein said driving insert is threadedly received in said sleeve inwardly of said front opening and is operable upon rotation relative to said sleeve to displace said gripper means and said annular seal and O-ring contained therein both axially and inwardly of said pipe periphery.

9. A plug according to claim 8, wherein said gripper means comprises a plurality of metal segments annularly aligned within said sleeve, each of said metal segments having a series of teeth for engaging the outer periphery of the pipe, and a spring means located interiorly of said segments for normally biasing them and their teeth away from the pipe to facilitate insertion and withdrawal of the pipe with respect to the sleeve.

10. A plug according to claim 9 wherein said spring means includes a C-ring located interiorly of said segments for effecting said outward biasing action, and means providing passages for pressure fluid axially through said gripper segments.

11. A plug according to claim 9, further comprising a second O-ring located between said driving insert and said sleeve for providing a fluid-tight seal between said insert and said sleeve adjacent said front opening.

12. A plug according to claim 6 wherein said insert has an axial through bore for providing a pressure connection for test fluid admitted to said pipe.

13. A plug for creating a fluid-tight seal around the outer periphery of a pipe adjacent an open end thereof, comprising:

a sleeve having an interior chamber with a front opening and a rear opening, said front opening being larger than said rear opening, said sleeve capable of axially telescopically receiving an end portion of the pipe through said rear opening;

a driving insert capable of being inserted through said front opening and retained in said sleeve, said driving insert having a radial endface;

a first O-ring located between said driving insert and said sleeve for providing an annular fluid-tight seal between said insert and said sleeve adjacent said front opening;

a gripper assembly retained in said interior chamber between an interior surface of said sleeve, the outer periphery of the pipe, and said insert end face;

a resilient annular seal element retained in said interior chamber between said interior surface of said sleeve, the outer periphery of the pipe, and said gripper assembly;

a second O-ring located between said annular seal and the outer periphery of the pipe for providing a fluid-tight seal between the pipe and said annular seal;

means for displacing said driving insert in said sleeve toward said rear opening for causing said gripper assembly and said annular seal element to advance axially and inwardly along the outer periphery of the pipe; and camming surface means in said sleeve for cooperating with said gripper assembly and said annular seal element to urge them toward the outer surface of the pipe as said driving insert is displaced axially into said sleeve.

14. A plug according to claim 13, wherein said annular seal element has an inner peripheral wall for confronting said pipe periphery, and wherein said inner peripheral wall has a groove for retaining said second O-ring.

15. A plug according to claim 14, wherein said annular seal element has a tapered outer peripheral surface complementary to the camming surface means in said sleeve and slidably engageable therewith.

16. A plug according to claim 15, wherein said camming surface in said sleeve is frusto-conical and tapers inwardly toward said rear opening so that said gripper assembly and said annular seal element are forced inwardly toward the outer periphery of the pipe as said gripper assembly and said annular seal element are displaced axially toward said rear opening.

17. A plug according to claim 13, wherein said driving insert and said sleeve are threaded to provide said driving insert displacing means.

18. A plug according to claim 17, wherein both said driving insert and said sleeve have knurled outer peripheral surfaces for enabling them to be rotated relative to one another for mounting and dismounting the plug.

19. A plug according to claim 13, wherein said gripper assembly comprises a plurality of independent segments arranged in an annular array, each of said segments having a plurality of teeth adapted to engage the outer periphery of the pipe.

20. A plug according to claim 19 including means providing passages for pressure fluid between said gripper segments and to said annular seal element for causing said seal element and said second O-ring to fluid-tightly engage the pipe when pressure is applied therein.

21. A plug according to claim 19, further comprising resilient means located inwardly of said gripper segments for normally spacing said annular array of gripper segments away from said outer periphery of the pipe to facilitate installation and removal of the plug.

22. A plug according to claim 13 where said annular seal element and said second O-ring are of elastomeric material, and said seal element is of a higher durometer than said second O-ring.

23. A test plug for creating a fluid-tight seal against the outer periphery of a pipe adjacent an open end of the pipe, the plug being suitable for pressure testing pipes having a range of outer diameter tolerances, comprising:

a sleeve having an interior chamber extending axially between a front opening and a rear opening, the interior chamber being capable of telescopically receiving the end portion of the pipe axially through the rear opening, said sleeve having a threaded interior surface adjacent said front opening and a tapered interior surface adjacent said rear opening;

a threaded driving insert cooperatively engageable with said threads on said interior of said sleeve for movement axially inwardly and outwardly of said sleeve upon rotation;

a first O-ring extending between said sleeve interior surface and the outer periphery of said driving insert for providing a fluid-tight seal between said sleeve and said driving insert;

a plurality of gripper segments arranged in an annular array and retained within said sleeve interior chamber between said interior surface of said sleeve, the outer surface of the pipe, and said insert, said driving insert engageable with said gripper segments to advance said gripper segments toward said tapered interior sleeve surface, said tapered interior sleeve surface being operable to cam said gripper segments radially inward toward the outer periphery of the pipe as said gripper segments are displaced axially toward said rear opening;

a resilient annular seal element retained in said interior chamber between said interior surface of said sleeve, the outer periphery of the pipe and said gripper segments for engaging the pipe periphery;, a second O-ring contained in a peripheral groove in an inner wall of said annular seal element for providing a pressure seal against the outer periphery of the pipe when compressed between said annular seal and the outer periphery of the pipe, said driving insert being operable to displace said gripper segments axially for urging said annular seal element toward said rear opening so that said tapered interior surface of said sleeve cams said annular seal element radially inward toward the outer surface of the pipe.

24. A test plug accordingly to claim 23 including passage means extending axially through said gripper segments for applying pressure to said annular seal element when the pipe is pressured, whereby the pressure urges the gripper segments and the annular seal element and the second O-ring into fluid-tight engagement with the pipe periphery.

* * * * *